Oct. 12, 1954      A. C. STOVER      2,691,283
PROPELLER SHAFT ASSEMBLY AND COUPLING STRUCTURE
Filed Oct. 20, 1952      2 Sheets—Sheet 1
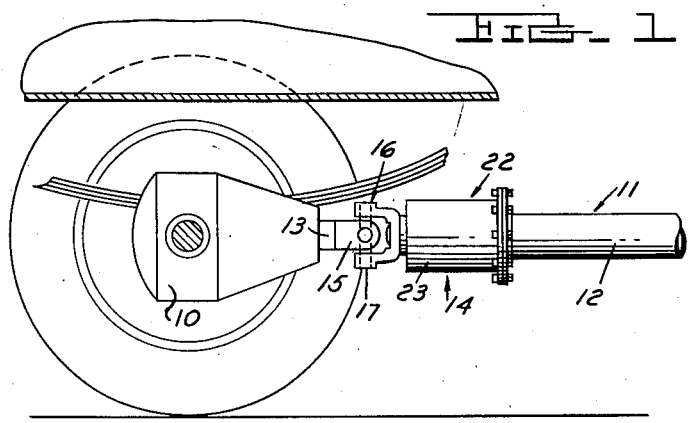
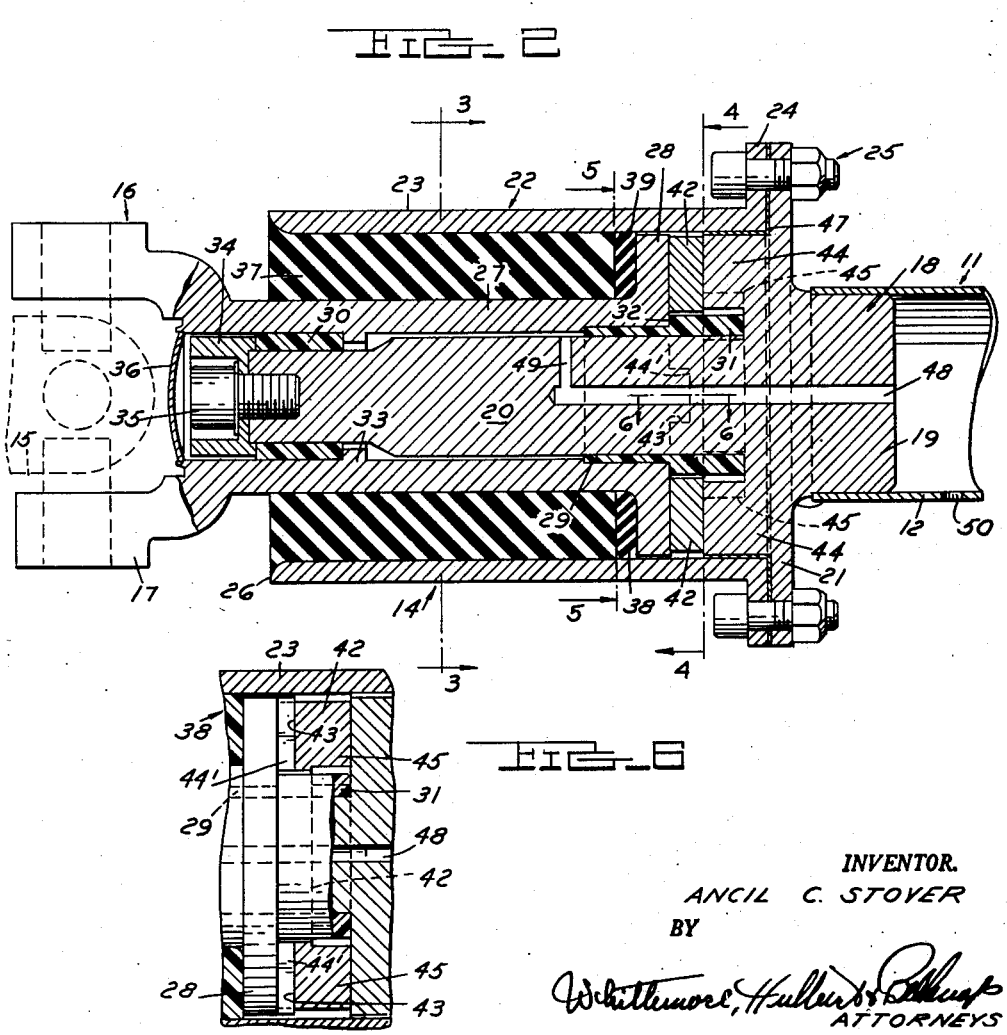
INVENTOR.
ANCIL C. STOVER
BY
*Whittemore, Hulbert & Belknap*
ATTORNEYS Oct. 12, 1954     A. C. STOVER     2,691,283
PROPELLER SHAFT ASSEMBLY AND COUPLING STRUCTURE
Filed Oct. 20, 1952     2 Sheets-Sheet 2

INVENTOR.
ANCIL C. STOVER
BY
Whittemore, Hulbert & Belknap
ATTORNEYS

Patented Oct. 12, 1954

2,691,283

UNITED STATES PATENT OFFICE 2,691,283

PROPELLER SHAFT ASSEMBLY AND
COUPLING STRUCTURE

Ancil C. Stover, Van Wert, Ohio, assignor to William W. Eisenhauer, William P. Ellwood, Ida J. Eisenhauer, and Leigh E. Eisenhauer, copartners, doing business as The Eisenhauer Manufacturing Company, Van Wert, Ohio, a firm Application October 20, 1952, Serial No. 315,777

12 Claims. (Cl. 64—11)

This invention relates to apparatus for reducing the objectionable vibrations which are created by the rotating parts of the propelling mechanism provided between an engine or power source and a driven unit such, for example, as the differential of a motor vehicle.

In many types of motor vehicles the engine is located varying distances from the differential unit for imparting rotation to the ground engaging driving wheels, and the power output member or shaft of the engine is connected to the differential unit by mechanism including a propeller shaft assembly. In some installations the propeller shaft assembly is of considerable length but in any case sets up torsional vibrations independently of any vibrations produced by the engine. The amplitude of the torsional vibrations of a propeller shaft of given diameter increases as the length of the shaft increases and in the majority of installations of the foregoing type the torsional vibrations are sufficiently severe to have a deterimental effect on the efficiency as well as the life of many of the parts of both the propeller shaft assembly and the differential or final drive mechanism. More particularly such torsional vibrations are largely responsible for power losses between the engine and final drive, objectionable noise in the operation of the propeller shaft assembly and final drive, and excessive wear of the perishable parts of said units.

With the above in view, it is an object of this invention to overcome the foregoing as well as other objections resulting from torsional vibrations created by the propeller shaft assembly by dividing the propeller shaft into relatively short sections and coupling the sections with a device capable of eliminating torsional vibrations or reducing the amplitude of such vibrations to a negligible quantity. In most normal installations one coupling device preferably positioned adjacent the final drive or differential will suffice, but regardless of the number of coupling devices provided, the end result is the same and that is to prevent torsional vibrations from building up along the propeller shaft from the engine to the final drive.

It is another object of this invention to provide a coupling device having means for transmitting torque from a driving propeller shaft section to an adjacent driven section through a resilient, yieldable medium capable of damping torsional vibrations and preventing the transmittal of such vibrations to the driven section.

It is still another feature of this invention to provide a coupling device of the foregoing type having provision for positively mechanically connecting the driving propeller shaft section to the driven section when the torque loads exceed a predetermined amount. Such a condition exists at low speeds when the vehicle is usually operating in low gear or, in other words, when the amplitude of any torsional vibration is at a minimum.

The foregoing as well as other objects will be made more apparent especially when considered in connection with the accompanying drawings wherein:

Figure 1 is a semi-diagrammatic elevational view partly in section of a portion of the running gear of a motor vehicle;

Figure 2 is a longitudinal sectional view through a part of the propeller shaft assembly shown in Figure 1;

Figure 4:
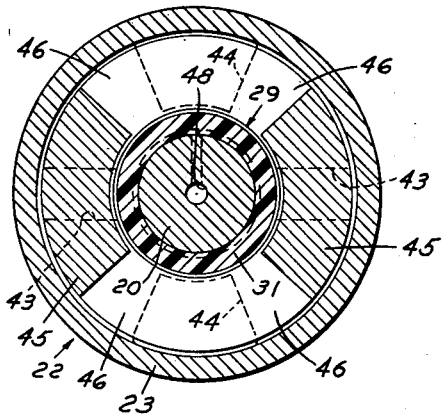
Figure 3:
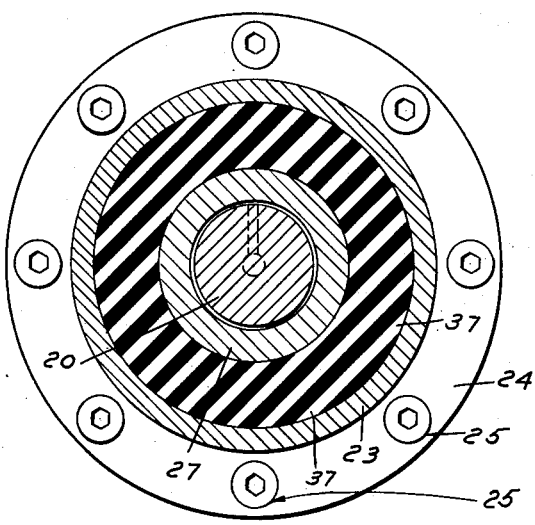
Figure 5:
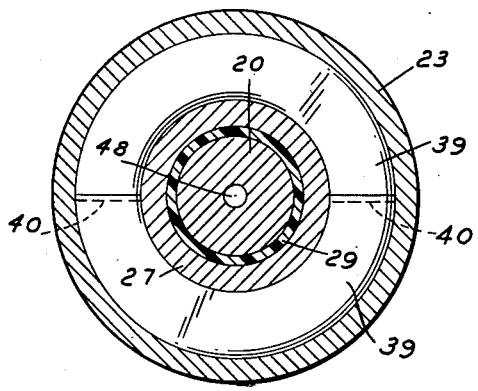
Figure 7:
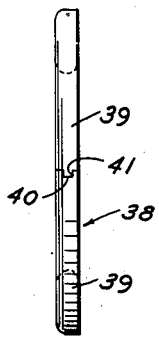

Figures 3-6 inclusive are respectively sectional views taken on the lines 3—3, 4—4, 5—5 and 6—6 of Figure 2; and Figure 7 is an end elevational view of the spacer shown in Figure 5.

The apparatus forming the subject matter of this invention is shown herein for the purpose of illustration in connection with a motor vehicle having a running gear of the type semi-diagrammatically shown in Figure 1 of the drawings. The running gear illustrated herein comprises a differential drive unit 10 and a propeller shaft assembly 11 for connecting the differential drive unit 10 to a source of power usually in the form of an internal combustion engine, not shown herein. The differential drive unit 10 may be of conventional design and transmits driving torque from the propeller shaft assembly 11 to the ground engaging wheels, one of which is shown in Figure 1 of the drawings.

In the operation of driving systems of the above general type torsional vibrations are created by the propeller shaft assembly, and the amplitude of such vibrations for a propeller shaft of given diameter increases as the length of the propeller shaft increases. In order to reduce the amplitude of torsional vibrations created by the propeller shaft assembly 11 to a minimum, the length of the propeller shaft assembly is divided into separate sections and the adjacent ends of the sections are connected together by a coupling constructed to provide controlled relative rotative movement of the sections. The length of the propeller shaft sections are determined to increase the natural frequencies of the individual sections beyond the factor which would induce or generate torsional vibration. Also, the construction of the coupling or couplings connecting the adjacent ends of the propeller shaft sections is such that any torsional vibrations created are prevented from being transmitted at an audible or destructive frequency.

It follows from the foregoing that in cases where the propeller shaft assemblies are of exceptional length it may be necessary to divide the assemblies into three or more sections in which event two or more couplings would be required. However, in the interests of simplicity, the propeller shaft assembly 11 is shown herein as divided into two substantially axially aligned sections 12 and 13 having the adjacent ends connected together by a coupling 14.

The shaft section 12 is in the form of an elongated tube having the outer end connected to a suitable power source or internal combustion engine (not shown) so that the section 12 may be considered the driving or torque transmitting section. The shaft section 13 is relatively short and is connected at the outer end to the final drive mechanism or to the differential 10. The inner end of the shaft section 13 has a yoke 15 which comprises one complementary part of a universal joint 16 having the other part 17 suitably connected to the coupling 14. The arrangement is such that torque is transmitted from the propeller shaft section 12 to the section 13 through the coupling 14.

The coupling 14 comprises a number of parts which include a stub shaft 18 having a cylindrical enlargement 19 sleeved within and secured to the shaft section 12. In addition the stub shaft 18 has a reduced portion 20 coaxially arranged with respect to the cylindrical enlargement 19 and projecting toward the shaft section 13. A flange 21 extends radially outwardly from the stub shaft 18 between the cylindrical enlargement 19 and the shaft portion 20 to provide anchorage means for a tubular housing 22.

The housing 22 has an elongated annular portion 23 concentrically positioned with respect to the shaft portion 20 and is formed with a radially outwardly extending flange 24 at the end thereof adjacent the flange 21 on the stub shaft 18. The flange 24 is removably secured to the flange 21 by a plurality of fastener devices 25 spaced from each other circumferentially of the flange 24.

The end 26 of the housing 22 opposite the flange 24 is open and a sleeve 27 projects into the housing 22 through the open end 26 thereof. The sleeve 27 is secured to or formed integral with the yoke 17 and the opposite end of the sleeve has a radially outwardly extending flange 28 terminating in close proximity to the inner cylindrical surface of the portion 23 of the housing 22. As shown in Figure 2 of the drawings the opposite end portions of the sleeve 27 are respectively journalled on the stub shaft portion 20 by bearings 29 and 30. The bearing 29 has an enlarged section 31 projecting axially beyond the adjacent end of the sleeve 27 and forming an annular shoulder 32 for abutting engagement with the latter end of the sleeve 27. The bearing 30 is seated on the opposite end of the shaft portion 20 which is reduced in diameter and axial movement of the bearing 30 in a direction toward the bearing 29 is prevented by a radially inwardly extending abutment 33 on the sleeve 27. Axial displacement of the bearing 30 in the opposite direction is prevented by a cap 34 located within the sleeve 27 and clamped to the reduced end of the stub shaft 18 by a stud 35. The end of the sleeve 27 beyond the cap 34 is sealed by a plug 36 which may be of the Welsh type.

The internal diameter of the cylindrical portion 23 of the housing 22 is substantially greater than the external diameter of the sleeve 27 in order to provide a space of generous cross sectional area for accommodating a body or sleeve 37 of yieldable resilient material such for example as rubber or a substance having characteristics similar to rubber. In practice the sleeve 37 of resilient material is molded in place and is thereby bonded to the inner surface of the housing and the outer surface of the sleeve 27.

A spacer ring 38 of non-metallic material such for example as Bakelite is rotatably supported on the sleeve 27 between the flange 28 and the adjacent end of the body 37 of resilient material. As shown in Figures 5 and 7 of the drawings the spacer ring 38 comprises two semicircular sections 39. One of the sections 39 has tongues 40 projecting from opposite ends thereof into grooves 41 formed in the corresponding ends of the other semicircular section 39. The construction is such that the spacer ring 39 is adjustable radially to some extent and renders it possible for the spacer to have a sealing contact with both the inner surface of the housing and the outer surface of the sleeve 27. It follows from the above that the spacer ring 38 prevents bonding of the resilient material 37 to the radial surface of the flange 28 on the sleeve 27 during the molding operation and, as a result, the bond between the sleeve of resilient material 37 and the housing 22 and sleeve 27 is relieved of undue stress during relative rotation of the housing and sleeve 27.

Since bonding of the sleeve 37 of rubber material is limited to the concentric surfaces of the housing 22 and sleeve 27, it follows that the rubber sleeve 37 is placed under shear upon relative rotation. In any case the rubber body 37 provides for sufficient relative rotation of the housing 22 and sleeve 27 to cancel-out or reduce the amplitude of torsional vibrations to a negligible amount.

The coupling 14 also has provision for establishing a positive drive between the shaft sections 11 and 13 after a predetermined relative rotation of said shaft sections. With this in view, reference is again made to Figure 2 of the drawings wherein it will be noted that a ring 42 surrounds the enlarged end 31 of the bearing 29 between the flange 28 on the sleeve 27 and the flange 21 on the stub shaft 18. As shown in Figure 6 of the drawings the surface of the ring 42 adjacent the flange 28 is formed with aligned radially extending slots 43 for slidably receiving projections or keys 44' extending axially from the flange 28. The internal diameter of the ring 42 is slightly greater than the external diameter of the enlargement 31 on the bearing 29 and the outer diameter of the ring is slightly less than the internal diameter of the portion 23 of the housing 22. The arrangement is such as to permit sliding movement of the ring 42 radially relative to both the stub shaft 18 and the sleeve 27. The purpose of this particular construction will be more fully hereinafter described.

As shown in Figures 2 and 4 of the drawings the flange 21 on the stub shaft 18 is formed with a pair of circumferentially spaced projections 44 which extend axially into the housing 22 toward the ring 42. In the present instance, the projections 44 are concentrically arranged with respect to the enlargement 31 on the bearing 29 and are spaced 180° from one another. It will also be noted from Figure 4 of the drawings that the ring 42 is formed with a pair of projections 45 which extend axially toward the flange 21 on the stub shaft 18 and which are spaced 180° from one another. The projections 45 respectively extend between the projections 44 and are also concentrically arranged with respect to the cylindrical enlargement 31 on the bearing 29.

The arcuate extent of the projections 44 and 45 is predetermined to provide the desired clearance spaces 46 between adjacent sides of the projections. In the specific embodiment of the invention the arcuate extent of each projection 44 is 47° and the arcuate extent of each projection 45 is 83°. In the rest position of the coupling the projections are centered with respect to one another so that the arcuate extent of the spaces 46 is approximately 25°.

As a result of the above the total torsional load imposed on the propeller shaft 11 is cushioned by the body of resilient material 37 in either direction of rotation of the propeller shaft. The extent of the torsional load transmitted through the resilient body 37 depends on the arcuate extent of the clearance spaces 46 and when the torsional load becomes sufficiently high to enable the projections 44 on the stub shaft 18 to engage the projections 45 on the ring 42, a positive driving connection is provided between the propeller shaft sections 12 and 13. In practice, the clearance spaces 46 are sufficient to enable the total torsional load imposed on the propeller shaft to be transmitted through the body of resilient material 37 when the vehicle is operating in direct drive or high gear. However, when the torsional load imposed on the propeller shaft becomes exceptionally heavy as is the case when the vehicle is operating in reverse and in the lower forward speed ranges, the body of resilient material 37 is bypassed and torque is transmitted directly through the projections 44 and 45. It is to be understood of course that the above specific conditions and values are merely given by way of example and that different specified operating conditions may be obtained by varying the arcuate extent of the clearance spaces 46.

It has been pointed out above that the projections 45 are formed on the ring 42 rather than on the flange 28 of the sleeve 27 and that the ring 42 is shiftable radially relative to both the flange 28 and flange 21 on the stub shaft 18. As a result of this construction the torque loads are imposed on the ring 42 in direct drive and, since the ring 42 is shiftable radially relative to the stub shaft 18, such loads are more uniformly distributed around the bearings 29 and 30.

The interior of the coupling is preferably filled at the time of manufacture with a lubricant which is prevented from escaping out of the rear end of the coupling by the Welsh plug 36 and is prevented from escaping out of the front end of the coupling by a gasket 47 clamped between the flanges 21 and 24 by the fastener elements 25. Any tendency for pressure to build up within the coupling due to increases in temperature of the lubricant is overcome by a vent passage 48 which extends rearwardly from the front end of the stub shaft 18 in concentric relation to the axis of said shaft. The rear end of the passage 48 communicates with the interior of the coupling through a radially extending passage 49 and the front end of the passage 49 is vented to the atmosphere through a port 50 formed in the tubular section 12 of the propeller shaft.

What I claim as my invention is:

1. A propeller shaft assembly having substantially aligned first and second shaft sections, a coupling interposed between and connected to said sections, said coupling comprising a housing concentrically arranged relative to the propeller shaft axis, a part forming a unit with the housing at the end of the latter adjacent the first shaft section and connected to said first shaft section, a member secured to the second shaft section and extending into the opposite end of the housing in concentric relation thereto, a body of yieldable rubber material surrounding the member within the housing and having the inner and outer surfaces respectively bonded to the member and housing, a ring supported between the part aforesaid and adjacent end of the member for shifting movement radially relative to the shaft axis and rotatable as a unit with the member, means on said part providing an axially extending abutment, and means on said ring providing a cooperating axially extending abutment projecting into the path of rotation of the abutment on the part aforesaid in circumferential spaced relationship to the abutment on said part and engageable with the latter abutment after a predetermined relative rotation of the ring and part to establish a positive driving connection between propeller shaft sections.

2. A propeller shaft assembly having substantially aligned first and second shaft sections, a coupling interposed between and connected to said shaft sections, said coupling comprising a stub shaft secured to the first shaft section in coaxial relationship thereto and having a radially outwardly extending flange part intermediate the ends thereof, a tubular housing concentrically arranged with respect to the stub shaft and secured to said flange part, a sleeve part journalled on the stub shaft within the housing and connected to the second shaft section, a body of resilient rubber material encircling the sleeve part within the housing and bonded to the inner surface of the housing and the outer surface of the sleeve part, and means between the radial flange part on the stub shaft and the adjacent end of the sleeve part for transmitting torque from one shaft section to the other in response to a predetermined relative rotative movement of the housing and sleeve part in either direction.

3. The propeller shaft assembly defined in claim 2 wherein said means comprises a ring encircling the stub shaft between the radial flange part on the stub shaft and the adjacent end of the sleeve part, means securing the ring to the sleeve part for rotation as a unit with the sleeve part and for shifting movement radially relative to the sleeve part and stub shaft, circumferentially spaced first and second abutments on one of said parts, and a third abutment on the other part positioned between the first and second abutments in circumferential spaced relation to both the latter and engageable with one or the other of said first and second abutments after a predetermined degree of relative rotation of the stub shaft and sleeve part to positively transmit torque from one propeller shaft section to the other.

4. A coupling for damping torsional vibrations, comprising a rotatable housing open at one end and having a closure part at the opposite end, a rotatable member extending into the housing through the open end thereof and concentrically arranged with respect to the housing, a body of resilient material surrounding said member within the housing and bonded to both the inner surface of the housing and the outer surface of said member, a flange extending radially outwardly from the end of the member adjacent the closure part into close proximity to the inner surface of the housing beyond the body of resilient material, and a spacer ring rotatably supported on said member between the body of resilient material and flange, said spacer ring engageable with the inner surface of the housing and the outer surface of the member to prevent contact of the body of resilient material with said flange part.

5. A coupling for damping torsional vibrations, comprising a rotatable housing open at one end and having a closure part at the opposite end, a rotatable member extending into the housing through the open end thereof and concentrically arranged with respect to the housing, a body of resilient material surrounding said member within the housing and bonded to both the inner surface of the housing and the outer surface of said member, a flange extending radially outwardly from the end of the member adjacent the closure part, a ring part surrounding the member between the flange and closure part and shiftable radially relative to the latter, a driving connection between the flange and ring part, circumferentially spaced abutments on one of the parts, an abutment on the other part projecting between the abutments on said one part in circumferential spaced relationship to the abutments on the first part and engageable with one or the other of the latter abutments after a predetermined relative rotative movement of said parts.

6. The coupling defined in claim 5 wherein said closure part has a shaft portion projecting axially of the housing and wherein said member comprises a sleeve journaled on the shaft portion.

7. The coupling defined in claim 5 comprising a spacer ring rotatably supported on the member between the flange and adjacent end of the body of resilient material.

8. A propeller shaft assembly having substantially aligned first and second shaft sections, a coupling interposed between and connected to said sections, said coupling comprising a tubular housing connected to the first shaft section in concentric relation to the axis of rotation of said first shaft section, a part connected to the second shaft section and extending axially into the housing in concentric relation thereto, a flange extending radially outwardly from said part and located within the housing, a sleeve of yieldable material surrounding said part within the housing at one side of the flange and bonded to the inner surface of the housing and to the outer surface of said part, a spacer ring rotatably supported on said part between the flange and adjacent end of the yieldable sleeve, an abutment rotatable as a unit with the housing and extending axially of the housing toward said flange, and means rotatable as a unit with said part extending into the path of rotation of the abutment in circumferential spaced relation thereto and engageable with the abutment after a predetermined relative rotation of the part and housing to establish a positive driving connection between the propeller shaft sections.

9. The propeller shaft assembly defined in claim 8 wherein the spacer ring is expandible in a radial direction to provide a sealing contact with the inner surface of the housing and with the outer surface of said part.

10. The propeller shaft assembly defined in claim 9 wherein the spacer ring comprises semicircular sections cooperating with each other to form an annulus and having the adjacent ends slidably engageable with one another.

11. A propeller shaft assembly having substantially aligned first and second shaft sections, a coupling interposed between and connected to said sections, said coupling comprising a shaft element connected to the first shaft section in coaxial relationship to said first shaft section, a tubular part journaled on the shaft element and connected to the second shaft section, a radially outwardly projecting flange on the tubular part, a tubular housing surrounding the tubular part and flange and connected to the shaft element, a sleeve of yieldable material extending into the annular space provided at one side of the flange between the tubular part and housing and bonded to the inner surface of the housing and to the outer surface of the tubular part to provide limited relative movement of the tubular part and shaft element, a ring supported at the opposite side of the flange in concentric relationship to the shaft element and movable radially relative to the flange, a driving connection between the flange and ring for rotating the latter, and cooperating driving elements on the ring and shaft element engageable with one another after a predetermined degree of relative rotation of the shaft element and tubular part.

12. The propeller shaft assembly defined in claim 11 comprising a spacer ring rotatably supported on the tubular part between the flange and adjacent end of the yieldable sleeve.

References Cited in the file of this patent

UNITED STATES PATENTS

| Number | Name | Date |
| --- | --- | --- |
| 2,394,405 | Schjolin | Feb. 5, 1946 |